United States Patent [19]
Lynch et al.

[11] Patent Number: 5,816,926
[45] Date of Patent: Oct. 6, 1998

[54] BALL AND SOCKET DOUBLE CARDAN MOTION UNIVERSAL JOINT

[75] Inventors: Jack Lynch, Goshen, Conn.; Martin G. Riccitelli, Westfield, Mass.

[73] Assignee: The Torrington Company, Torrington, Conn.

[21] Appl. No.: 867,833

[22] Filed: Jun. 3, 1997

[51] Int. Cl.$^6$ ........................................ F16D 3/20
[52] U.S. Cl. ..................... 464/114; 464/118; 464/153
[58] Field of Search .................... 464/112, 114, 464/115, 116, 118, 147, 153, 905

[56] References Cited

U.S. PATENT DOCUMENTS

| | | | |
|---|---|---|---|
| 243,914 | 7/1881 | Johnston | 464/153 |
| 899,913 | 9/1908 | Shaw | 464/153 |
| 956,912 | 5/1910 | Walters | 464/115 |
| 1,732,354 | 10/1929 | Cooper | 464/153 |
| 2,297,457 | 9/1942 | Buchhart | 464/114 |
| 3,306,077 | 2/1967 | Piatti | 464/116 |
| 3,406,534 | 10/1968 | Chapper | 464/115 |
| 3,906,747 | 9/1975 | Orain | 464/905 |
| 4,207,757 | 6/1980 | Onuma et al. | |
| 4,395,246 | 7/1983 | Taig et al. | 464/153 |
| 4,490,125 | 12/1984 | Konrad et al. | 464/11 |
| 4,508,522 | 4/1985 | Numazawa et al. | 464/11 |
| 4,509,932 | 4/1985 | Weible | 464/109 |
| 4,650,439 | 3/1987 | Mayhew | 464/11 |
| 4,781,662 | 11/1988 | Mayhew et al. | 464/14 |
| 4,997,407 | 3/1991 | Kretschmer et al. | 464/11 |
| 5,419,740 | 5/1995 | Koyari et al. | 464/118 |
| 5,433,667 | 7/1995 | Schafer et al. | 464/118 |
| 5,525,110 | 6/1996 | Riccitelli et al. | 464/118 |

*Primary Examiner*—Eileen A. Dunn
*Attorney, Agent, or Firm*—Robert F. Palermo

[57] ABSTRACT

A compact double Cardan motion universal joint has a substantially cylindrical housing having an input end and an output end, with an input shaft and ball joint and an output shaft and interengaging ball joint, respectively; each ball joint consisting of a substantially spherical ball on the shaft member, a ball seat torsionally fixed in the housing, and pivots for providing articulation of the ball shaft about two orthogonal axes. Interengagement between the ball joints is provided by an interconnection ball joint consisting of a hollow socket on a joining end of one of the spherical ball shaft members of said universal joint, and a spherical ball on a joining end of the other spherical ball shaft member, the interconnection ball joint providing universal pivoting and translating motion at a juncture between interengaging portions of the ball shaft members. Pivoting and translating motion between the interengaging portions of said ball shaft members is limited, such that the input shaft and output shaft maintain substantially equal angles with the housing.

13 Claims, 2 Drawing Sheets

BALL AND SOCKET DOUBLE CARDAN MOTION UNIVERSAL JOINT

BACKGROUND OF THE INVENTION

This invention relates generally to universal joints and more particularly to ball and socket double Cardan joints.

Double Cardan joints provide constant velocity between an input shaft and an output shaft. This is the case as long as the angles between the input and output shafts and the casing of the double Cardan joint are equal. Such equality is provided by an interconnection joint which allows pivoting and translation between the interconnecting components, and which causes the joints to flex in a complementary manner.

There are many different types of double Cardan joints in use in automotive steering mechanisms. They are desirable because of the necessity for angular offsets between the steering wheel and the steering gear box due to decreasing sizes of cars, adjustable steering columns, and collapsible steering mechanisms. They consist essentially of two universal joints, connected to a housing, and an interconnection joint between the universal joints, engaging the abutting ends of the input and output shafts. By their nature, they are necessarily rather complex in structure and require a fairly large space in order to fit all the components required for their function. Due to the large number of components in such joints, they are difficult to assemble and present excessive opportunities for assembly errors, adverse tolerance accumulations, and associated cost overruns.

The foregoing illustrates limitations known to exist in present double Cardan joints. It would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a compact double Cardan motion universal joint comprising a substantially cylindrical housing having first and second ends; an input shaft and ball joint at the first end and an interengaging output shaft and ball joint at the second end, both ball joints disposed within the housing, each ball joint comprising a spherical ball shaft member, a ball seat torsionally fixed in the housing, and means for enabling pivoting of the ball shaft within the ball seat about two orthogonal axes; an interconnection ball joint comprising a hollow socket on a joining end of one of the ball shaft members, and a spherical ball on a joining end of the other of the ball shaft members, the interconnection ball joint providing universal pivoting and translating motion at a juncture between the joining ends; and means for limiting pivoting and translating motion between the interengaging portions of the ball shaft members.

The foregoing and other aspects will become apparent from the following detailed description of the invention when considered in conjunction with the accompanying drawings.

DETAILED DESCRIPTION

Figure 1:
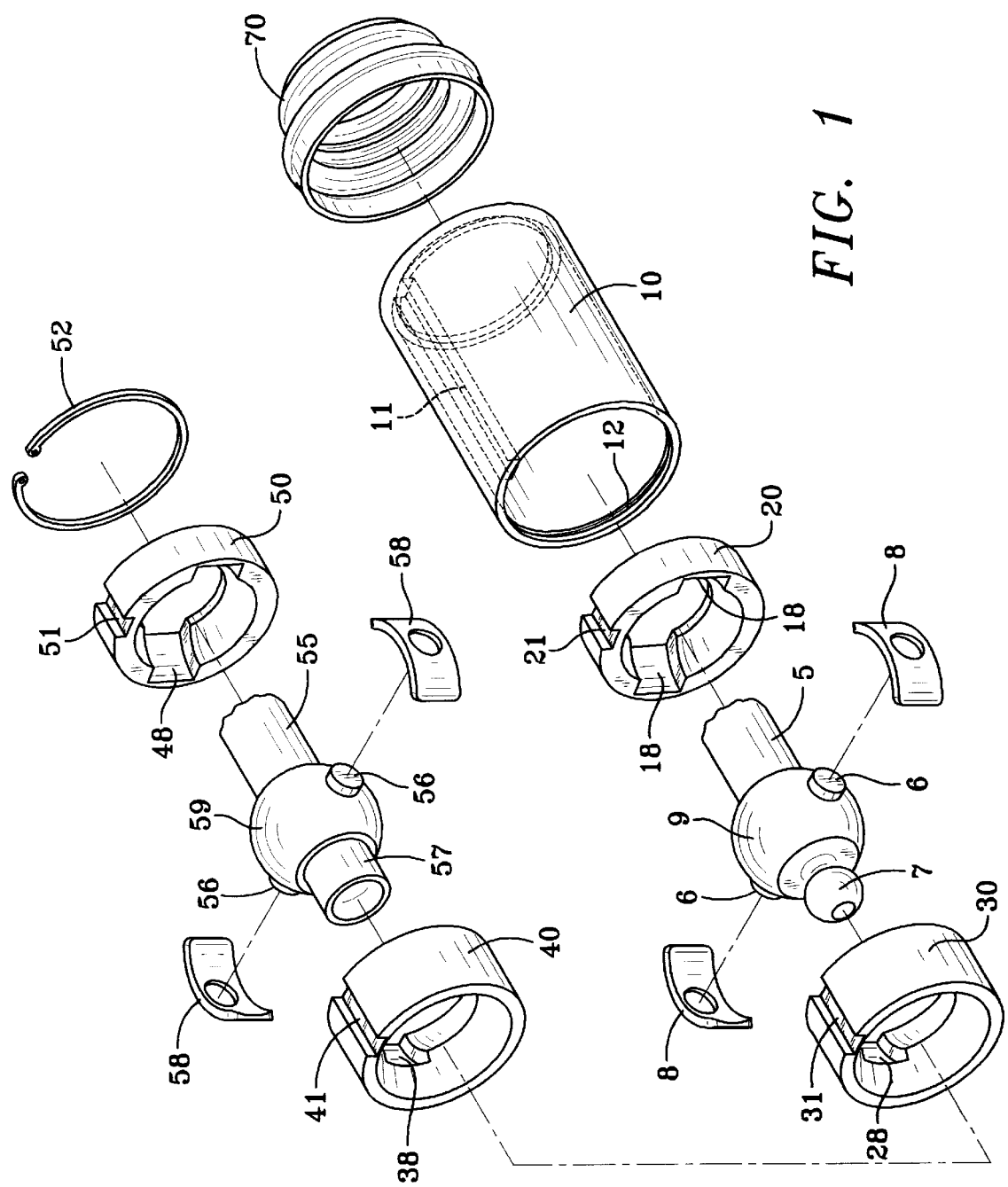
FIG. 1 is a schematic exploded perspective view showing the elements of the invention.
Figure 3:
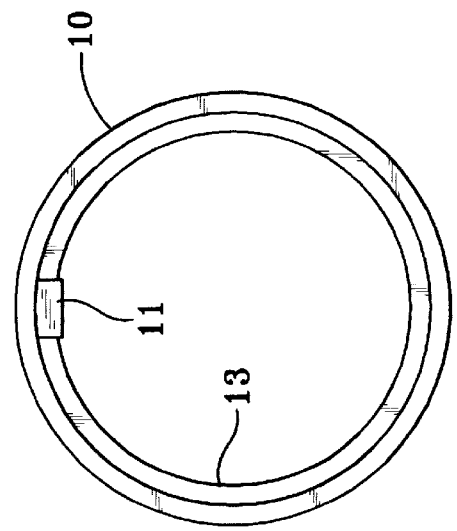
FIG. 3 is an elevation end view of the housing of FIG. 2.
Figure 2:
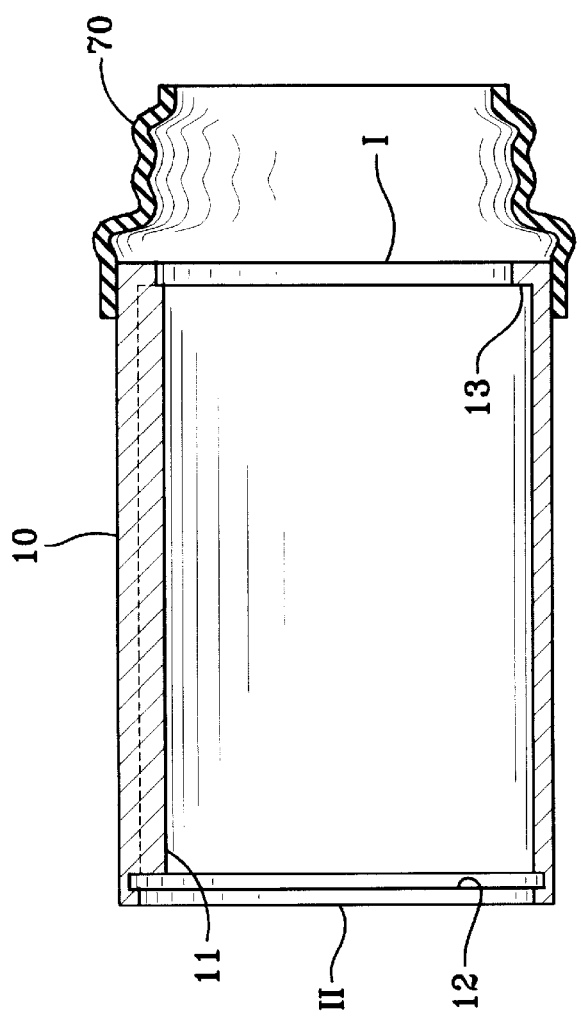
FIG. 2 is a longitudinal cross-sectional view of the housing of the invention.

The invention can be understood by reference to the FIGS. 1–3, in which all components are illustrated and their interrelationship shown. The ball and socket double Cardan joint is contained in a cylindrical housing 10, which has an input end I to receive an input shaft 55 and an output end II to receive an output shaft 5. The housing has a key 11 extending longitudinally the full length thereof which engages with keyways 21 and 31 on the output ball seats 20 and 30, respectively, and with keyways 41 and 51 on the input ball seats 40 and 50. This has the effect of securing the ball seats within the housing 10 in rotationally fixed position, so that any torque imposed on the input shaft 55 is transmitted to the output shaft 5. The key 11 and keyways 21, 31, 41, and 51 could be reversed such that the key(s) are on the ball seats and the keyway is on the housing, or the ball seats and the housing could both have keyways which engage with a separate key, with equal effectiveness. In the alternative, the housing 10 and the ball seat members 20, 30, 40, and 50 can be formed with longitudinal ridges and grooves which interengage to provide torsional immobility between the housing and ball seats. The particular arrangement chosen would depend upon manufacturing and cost considerations. One advantage of forming the key 11 as part of the housing 10 is that the housing could be formed by broaching from the input end I to simultaneously form the key 11 and the output ball seat retainer 13 on the output end II of the housing. A retaining ring groove 12 is provided at the input end I of the housing 10. This is one possible and commonly used retaining means which captures all the components within the housing after assembly, when the retaining ring 52 is installed. This retention can as well be accomplished by threaded fasteners or other retainer systems as dictated by assembly and performance requirements. A flexible boot 70, shown for example, in FIGS. 1 and 2 at the output end II of the housing is secured at each end I, II of the housing 10 to provide a seal between the input shaft 55, the output shaft 5, and the housing to exclude dirt and contain lubricant.

Input shaft 55 has a spherical ball member 59. Two trunnion pins 56 are diametrically oppositely disposed transversely to the axis of the input shaft. Pins 56 are rotatably received in mating holes in sliding spring members 58 and provide one axis of rotation for the spherical ball member 59 within the spherical ball seat formed by ball seat members 50 and 40. Ball seat members 50 and 40 have curved tracks 48 and 38, respectively, in which spring members 58 are seated and in which the spring members 58 can slide to provide an axis of rotation orthogonal to that provided by the pins 56 on ball member 59.

Similarly, the output shaft 5 has a spherical ball member 9 with trunnion pins 6 rotatably supported in bearing holes of sliding spring members 8 to provide one axis of rotation. The sliding spring members 8 are slidably fitted in curved tracks 18 and 28 of ball seat members 20 and 30 and provide a second axis of rotation, orthogonal to the axis of the trunnion pins 6. Ball seat members 20, 30 provide a spherical seat for the spherical portion 9 of the output shaft 5.

Input shaft 55 has an axially disposed cup-like socket member 57 which engages with an axially disposed spherical ball member 7 of output shaft 5. This interconnection ball joint causes the input and output shafts 55, 5 to pivot in a complementary manner and to form equal angles with the housing 10 to provide constant velocity between the input shaft 55 and the output shaft 5 at angles up to 50 degrees. The axially abutting ends of the input and output spherical ball seats 40, 30 have internal surfaces which are substantially conic and which limit the angular displacement of the interconnection ball joint and of the shafts to approximately 45 degrees. Necessarily, the interconnection ball joint must permit both translation and rotation between the ball member 7 and the socket member 57, since the spherical ball members 9, 59 of the output and input shafts 5, 55 are axially fixed. The cup-like socket member 57 and the spherical ball members can be provided on either shaft, but the arrangement described is preferred; because, as described, the cup-like socket member is oriented downwardly and sheds dirt and wear particles instead of catching them.

Assembly of the joint is easily accomplished by placing ball seat member 20 and housing 10 over output shaft 5, installing sliding spring members 8 on trunnion pins 6, and inserting the spring members into the curved tracks 18 of the ball seat member. The ball seat member 20, with its keyway 21 aligned with key 11 of the housing 10 is started into the housing. Ball seat member 30 is aligned so that sliding spring members 8 enter the curved tracks 28 and the keyway 31 aligns with key 11, and it is also started into the housing followed by a properly aligned ball seat member 40. Input shaft 55, with sliding spring members 58 installed on trunnion pins 56 is inserted into the housing with the sliding spring members 58 aligned with the curved tracks 38 and the interconnection ball socket 57 aligned to receive the interconnection ball 7. Ball seat member 50 is aligned so curved tracks 48 receive sliding spring members 58 and keyway 51 receives key 11, and it is also inserted into the housing 10. The retainer ring 52 is installed in the groove 12, and the assembly is complete.

The ball and socket double Cardan joint disclosed provides several advantages. It requires a smaller package envelope than present double Cardan joints. (In one case 13mm smaller diameter and 6mm shorter in length). It is a simple low cost modular design which can be assembled in one direction by loading parts from the top or input end I. This simplified unidirectional assembly is a significant advantage when applied to automobile steering columns; because it can allow assembly of columns in restrictive spaces in which it would otherwise not be possible.

Having described the invention, we claim:

1. A compact double Cardan motion universal joint comprising:

a substantially cylindrical housing having first and second ends;

an input shaft and ball joint at said first end and an interengaging output shaft and ball joint at said second end, both said ball joints disposed within said housing, each said ball joint comprising a spherical ball shaft member with a spherical ball portion secured in a spherical ball seat which is torsionally fixed in said housing, and means engaged with said ball portion and said ball seat for enabling pivoting of said ball shaft member about two orthogonal axes;

an interconnection ball joint comprising a hollow socket on a joining end of one of said ball shaft members, and a spherical ball on a joining end of the other of said ball shaft members, said interconnection ball joint providing universal pivoting and translating motion at a juncture between said joining ends; and means for limiting pivoting and translating motion between the interengaging portions of said ball shaft members.

2. The compact universal joint of claim 1, wherein the means for enabling pivoting of each said ball shaft about two orthogonal axes comprises two diametrically opposed trunnion pins on the spherical ball portion of each said ball shaft, each said pin being journaled in a flexible spring member, and each said flexible spring member being slidably disposed in a curved axially disposed track in said spherical ball seat.

3. The compact universal joint of claim 1, wherein each said spherical ball seat comprises two axially abutting ball seat members and is torsionally fixed to said housing by a longitudinal groove on an outer surface of said ball seat engaging a longitudinal key on an inner wall of said housing to provide torque transmission between said input shaft and said output shaft.

4. The compact universal joint of claim 1, further comprising:

flexible polymeric boot members in sealing engagement with external surfaces of said housing, said input shaft, and said output shaft.

5. The compact universal joint of claim 1, wherein each said spherical ball seat comprises two axially abutting ball seat members which form a substantially spherical cavity and which grasp said ball shaft member to provide axial retention for said ball shaft member.

6. The compact universal joint of claim 1, wherein the hollow socket member of said interconnection ball joint is disposed on said input shaft.

7. The compact universal joint of claim 1, wherein said ball seats are torsionally fixed in said housing by longitudinally interengaging grooves and ridges formed on said ball seats and said housing.

8. A compact double Cardan motion universal joint comprising:

a substantially cylindrical housing having first and second ends;

an input shaft and ball joint at said first end and an interengaging output shaft and ball joint at said second end, both said ball joints disposed within said housing, each said ball joint comprising a spherical ball shaft member with a ball portion secured in a ball seat which is torsionally fixed in said housing, two diametrically opposed trunnion pins on the ball portion of each said ball shaft, each said pin being journaled in a flexible spring member, and each said flexible spring member being slidably disposed in an axially disposed track in said ball seat;

an interconnection ball joint comprising a hollow socket on a joining end of one of said ball shaft members, and a spherical ball on a joining end of the other of said ball shaft members, said interconnection ball joint providing universal pivoting and translating motion at a juncture between said joining ends; and means for limiting pivoting and translating motion between the interengaging portions of said ball shaft members.

9. The compact universal joint of claim 8, wherein each said ball seat comprises two axially abutting ball seat members and is torsionally fixed to said housing by a longitudinal groove on one of an outer surface of said ball seat and an inner wall of said housing engaging a longitudinal ridge on the other of an inner wall of said housing and an outer surface of said ball seat to provide torque transmission between said input shaft and said output shaft.

10. The compact universal joint of claim 9, further comprising:

flexible polymeric boot members in sealing engagement with external surfaces of said housing, said input shaft, and said output shaft.

11. The compact universal joint of claim 10, wherein the two axially abutting ball seat members of each said ball seat which form a substantially spherical cavity and which grasp said ball shaft member to provide axial retention for said ball shaft member.

12. The compact universal joint of claim 11, wherein the hollow socket member of said interconnection ball joint is disposed on the ball shaft member of said input shaft.

13. The compact universal joint of claim 8, wherein said ball seats are torsionally fixed in said housing by a key longitudinally disposed between said ball seats and said housing and engaging longitudinal keyways in said ball seats and said housing.

* * * * *